United States Patent
Wang

(10) Patent No.: US 9,841,044 B2
(45) Date of Patent: Dec. 12, 2017

(54) GROOVED ROTATABLY FASTENING STRUCTURE, ROTATABLY FASTENING COMBO, AND PACKAGING STRUCTURE

(71) Applicant: DTECH PRECISION INDUSTRIES CO., LTD., New Taipei (TW)

(72) Inventor: Ting-Jui Wang, New Taipei (TW)

(73) Assignee: DTECH PRECISION INDUSTRIES CO., LTD. (TW)

( * ) Notice: Subject to any disclaimer, the term of this patent is extended or adjusted under 35 U.S.C. 154(b) by 372 days.

(21) Appl. No.: 14/513,408

(22) Filed: Oct. 14, 2014

(65) Prior Publication Data

US 2015/0104247 A1    Apr. 16, 2015

(30) Foreign Application Priority Data

Oct. 15, 2013   (TW) .............................. 102219203 U

(51) Int. Cl.
| | |
|---|---|
| *F16B 21/04* | (2006.01) |
| *F16B 41/00* | (2006.01) |
| *F16B 5/02* | (2006.01) |
| *F16B 5/06* | (2006.01) |

(52) U.S. Cl.
CPC ............ *F16B 21/04* (2013.01); *F16B 5/0208* (2013.01); *F16B 41/002* (2013.01); *F16B 5/0642* (2013.01); *Y10T 403/7007* (2015.01)

(58) Field of Classification Search
CPC ............. Y10T 403/7007; F16B 41/002; F16B 5/0208; F16B 5/0642; F16B 21/04
USPC ......................... 411/999, 349, 549, 552, 553
See application file for complete search history.

(56) References Cited

U.S. PATENT DOCUMENTS

| | | | | | |
|---|---|---|---|---|---|
| 1,394,177 | A | * | 10/1921 | Jones | G03B 21/43 242/597.4 |
| 2,123,068 | A | * | 7/1938 | Mills | F16B 5/10 411/552 |
| 2,339,591 | A | * | 1/1944 | Weber | F16B 5/10 411/554 |
| 3,222,744 | A | * | 12/1965 | Dellith | F16B 21/02 411/337 |
| 3,244,212 | A | * | 4/1966 | Barry | F16B 41/002 411/361 |
| 3,250,559 | A | * | 5/1966 | Sommerfeld | F16B 5/0208 29/512 |
| 3,327,363 | A | * | 6/1967 | Knight | F16B 5/10 411/555 |
| 3,465,803 | A | * | 9/1969 | Swanstrom | F16B 5/0208 411/349 |

(Continued)

*Primary Examiner* — Robert Canfield
(74) *Attorney, Agent, or Firm* — Schmeiser, Olsen & Watts, LLP

(57) ABSTRACT

A grooved rotatably fastening structure includes, in top-to-bottom sequence, a head, a shaft connected to the head, and a fastening portion connected to the shaft. The fastening portion has a first groove and a second groove. The first groove is concavely disposed on a lateral surface of the fastening portion and extends upward from a bottom of the fastening portion. The second groove is concavely disposed on the lateral surface of the fastening portion and extends from the first groove transversely or obliquely. The first groove and the second groove are in communication. The rotatably fastening structure enables users to connect two objects together quickly without compromising the structural strength of the two objects and is applicable to thin objects.

23 Claims, 14 Drawing Sheets

(56) References Cited

U.S. PATENT DOCUMENTS

| | | | | |
|---|---|---|---|---|
| 3,510,922 A * | 5/1970 | Dzus | F16B 5/10 | 411/347 |
| 3,594,876 A * | 7/1971 | Gunther | F16B 21/04 | 411/555 |
| 3,688,352 A * | 9/1972 | Gunther | F16B 21/04 | 411/555 |
| 4,067,090 A * | 1/1978 | Schenk | F16B 21/04 | 411/554 |
| 4,227,287 A * | 10/1980 | Gunther | F16B 21/04 | 411/350 |
| 4,250,600 A * | 2/1981 | Gunther | F16B 21/04 | 411/350 |
| 4,398,322 A * | 8/1983 | Ewen | F16B 21/04 | 24/595.1 |
| 4,442,561 A * | 4/1984 | Gunther | F16B 21/04 | 409/132 |
| 4,911,726 A * | 3/1990 | Warkentin | F16B 21/02 | 411/337 |
| 4,915,557 A * | 4/1990 | Stafford | F16B 5/0208 | 292/251 |
| 5,154,559 A * | 10/1992 | Wagner | F16B 41/002 | 403/21 |
| 6,086,480 A * | 7/2000 | Ellis | B21D 22/206 | 470/16 |
| 6,619,898 B1 * | 9/2003 | Cosenza | F16B 21/02 | 411/353 |
| 6,644,903 B1 * | 11/2003 | Arand | F16B 5/0208 | 411/107 |
| 6,761,521 B2 * | 7/2004 | McCormack | F16B 5/0208 | 411/107 |
| 7,377,735 B2 * | 5/2008 | Cosenza | F16B 41/002 | 411/353 |
| 7,448,823 B2 * | 11/2008 | Silva | F16G 15/06 | 403/325 |
| 2002/0172574 A1 * | 11/2002 | McCormack | F16B 5/0208 | 411/352 |
| 2007/0014650 A1 * | 1/2007 | Hain | F16B 41/002 | 411/353 |
| 2007/0196196 A1 * | 8/2007 | Schorling | F16B 21/04 | 411/555 |
| 2009/0191976 A1 * | 7/2009 | Wang | F16B 5/0208 | 470/2 |
| 2010/0260578 A1 * | 10/2010 | Ullein | F16B 41/002 | 411/360 |
| 2014/0093326 A1 * | 4/2014 | Wang | F16B 39/22 | 411/103 |
| 2014/0321901 A1 * | 10/2014 | Wang | F21V 11/14 | 403/42 |
| 2014/0321906 A1 * | 10/2014 | Wang | F16B 21/06 | 403/299 |
| 2015/0063905 A1 * | 3/2015 | Wang | F16B 21/09 | 403/327 |
| 2015/0152902 A1 * | 6/2015 | Bachman | F16B 5/0208 | 411/107 |
| 2015/0240860 A1 * | 8/2015 | Wang | F16B 5/0266 | 411/147 |
| 2015/0260216 A1 * | 9/2015 | Tseng | F16B 39/02 | 411/103 |
| 2016/0220274 A1 * | 8/2016 | Lang, Jr. | A61B 17/645 | |

* cited by examiner

GROOVED ROTATABLY FASTENING STRUCTURE, ROTATABLY FASTENING COMBO, AND PACKAGING STRUCTURE

CROSS-REFERENCE TO RELATED APPLICATION

This non-provisional application claims priority under 35 U.S.C. §119(a) on Patent Application No(s). 102219203 filed in Taiwan, R.O.C. on Oct. 15, 2013, the entire contents of which are hereby incorporated by reference.

FIELD OF TECHNOLOGY

The present invention relates to rotatably fastening structures, and more particularly, to a grooved rotatably fastening structure which enables users to connect two objects together quickly and is applicable to thin objects.

BACKGROUND

Conventional fixing elements for fixing two objects to each other are usually provided in the form of a plastic resilient engaging element. The fixing elements each comprise a resilient engaging body. Users exert a force upon the resilient engaging bodies with a tool to enable the resilient engaging bodies to fix the objects to each other by snap-engagement.

As mentioned above, the users must exert a force upon the resilient engaging bodies with a tool. If the force is exerted inappropriately, the resilient engaging bodies are likely to get damaged.

Moreover, the resilient engaging bodies are structurally fragile. As a result, there are difficulties in the resilient engaging body manufacturing process.

Furthermore, to be in snap engagement with the resilient engaging bodies, objects must be of a considerable degree of thickness. As a result, the resilient engaging bodies are not applicable to thin objects.

Accordingly, it is imperative to provide a rotatably fastening structure which is unlikely to be subjected to structural damage, enables users to connect two objects together quickly without compromising the structural strength of the objects, and is applicable to thin objects.

SUMMARY

In view of the aforesaid drawbacks of the prior art, it is an objective of the present invention to provide a rotatably fastening structure which not only enables users to connect two objects together quickly without compromising the structural strength of the objects but is also applicable to thin objects.

In order to achieve the above and other objectives, the present invention provides a grooved rotatably fastening structure which comprises a head, a shaft connected to the head, and a fastening portion connected to the shaft which are arranged in top-to-bottom sequence.

The fastening portion has: a first groove concavely disposed on a lateral surface of the fastening portion and extending upward from a bottom of the fastening portion; and a second groove concavely disposed on the lateral surface of the fastening portion and extending transversely or obliquely from the first groove such that the first groove is in communication with the second groove.

Regarding the rotatably fastening structure, a bottom of the first groove is connected to a bottom side of the fastening portion.

Regarding the rotatably fastening structure, a first included angle ranging from 60° to 120° is formed between the first groove and the bottom side of the fastening portion.

Regarding the rotatably fastening structure, the second groove extends transversely from the top end of the first groove.

Regarding the rotatably fastening structure, the first groove is of a larger width than the second groove.

Regarding the rotatably fastening structure, the first groove is deeper than the second groove.

Regarding the rotatably fastening structure, the shaft is slender and cylindrical.

The rotatably fastening structure further comprises a first position-limiting portion disposed at the shaft and a sleeve having: a second position-limiting portion disposed on an inner wall of the sleeve; and a connection portion disposed at the sleeve, wherein the first position-limiting portion and the second position-limiting portion are interfered with each other, thereby allowing the sleeve and the shaft to be movably coupled together and not separable.

Regarding the rotatably fastening structure, the sleeve has a stopping element disposed in the sleeve and disposed below the second position-limiting portion. The stopping element and the second position-limiting portion are movably interfered, thereby allowing the sleeve and the shaft to be movably coupled together and not separable.

The rotatably fastening structure further comprises: a cap body circumferentially disposed at the head, wherein a first position-limiting portion is disposed at a bottom of the cap body, and a sleeve having: a second position-limiting portion disposed on an outer wall of the sleeve; and a connection portion disposed at the sleeve, wherein the first position-limiting portion and the second position-limiting portion are interfered with each other, thereby allowing the sleeve and the cap body to be movably coupled together and not separable.

The rotatably fastening structure further comprises: an abutting portion disposed at the sleeve; and a resilient element with two ends abutting against the bottom of the head and the abutting portion, respectively. The resilient element is a spring, a washer, a resilient pad or a resilient post.

Regarding the rotatably fastening structure, the top end of the first groove is higher than the second groove.

Regarding the rotatably fastening structure, the fastening portion has a third groove concavely disposed on the lateral surface of the fastening portion and extending transversely from the second groove. The second groove and the third groove are in communication.

Regarding the rotatably fastening structure, the second groove and the third groove are perpendicular to each other.

Regarding the rotatably fastening structure, the fastening portion has a bump protruding from the second groove.

Regarding the rotatably fastening structure, the fastening portion has a third groove concavely disposed on the lateral surface of the fastening portion and extending transversely from the second groove. The second groove and the third groove are in communication.

Regarding the rotatably fastening structure, the second groove extends obliquely downward from the top of the first groove. A second included angle ranging from 3° to 87° is formed between the first groove and the second groove.

Regarding the rotatably fastening structure, the second groove extends obliquely upward from the top of the first groove. A second included angle ranging from 93° to 150° is formed between the first groove and the second groove.

Regarding the rotatably fastening structure, the fastening portion has a fourth groove which is concavely disposed on the lateral surface of the fastening portion and extends transversely from the third groove. The third groove and the fourth groove are in communication.

Regarding the rotatably fastening structure, the fastening portion has a fifth groove which is concavely disposed on the lateral surface of the fastening portion and extends upward or downward from the fourth groove. The fourth groove and the fifth groove are in communication.

Moreover, another objective of the present invention is to provide a rotatably fastening combo for use with an object with a hole and thus dispense with the hassle of performing a hole drilling process.

In order to achieve the above and other objectives, the present invention provides a rotatably fastening combo which comprises the aforesaid rotatably fastening structure and an adjoining element structure. The adjoining element structure comprises a sleeve body and an object connection portion disposed at the bottom of the sleeve body. The sleeve body has: a receiving recess concavely disposed on the sleeve body and having an opening disposed at a top of the sleeve body, wherein the opening corresponds in position to the fastening portion of the rotatably fastening structure; and a protruding element protruding from a lateral surface of the receiving recess and corresponding in position to the second groove and the first groove at the fastening portion of the rotatably fastening structure.

Furthermore, yet another objective of the present invention is to provide a packaging structure for packaging the rotatably fastening structure.

In order to achieve the above and other objectives, the present invention provides a packaging structure for packaging at least a said rotatably fastening structure. The packaging structure comprises at least a position-limiting receiving body which has a position-limiting receiving space, such that the rotatably fastening structure is disposed in the position-limiting receiving space.

In conclusion, a rotatably fastening structure of the present invention enables users to connect two objects together quickly without compromising the structural strength of the two objects and is applicable to thin objects.

BRIEF DESCRIPTION

Objectives, features, and advantages of the present invention are hereunder illustrated with specific embodiments in conjunction with the accompanying drawings, in which.

DETAILED DESCRIPTION

Figure 1:
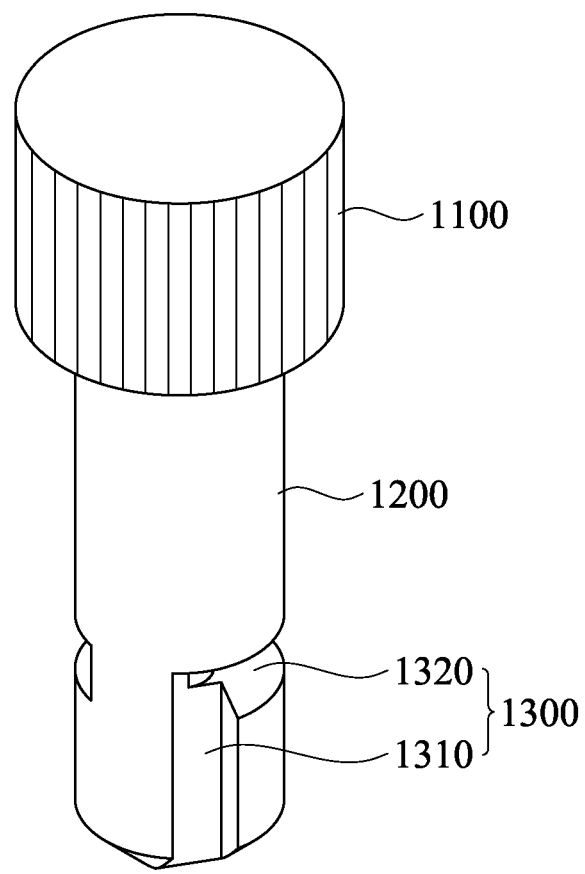
FIG. 1 is a perspective view of a rotatably fastening structure according to the first embodiment of the present invention.

Referring to FIG. 1, there is shown a perspective view of a grooved rotatably fastening structure 1001 according to the first embodiment of the present invention. The rotatably fastening structure 1001 comprises, in top-to-bottom sequence, a head 1100, a shaft 1200, and a fastening portion 1300. The shaft 1200 is connected to the bottom side of the head 1100. The fastening portion 1300 is connected to the bottom side of the shaft 1200.

The fastening portion 1300 has a first groove 1310 and a second groove 1320. The first groove 1310 is concavely disposed on a lateral surface of the fastening portion 1300 and extends upward from the bottom of the fastening portion 1300. The bottom of the first groove 1310 is connected to the bottom side of the fastening portion 1300. The second groove 1320 is concavely disposed on the lateral surface of the fastening portion 1300 and extends transversely from the top end of the first groove 1310. The first groove 1310 is in communication with the second groove 1320.

Figure 2:
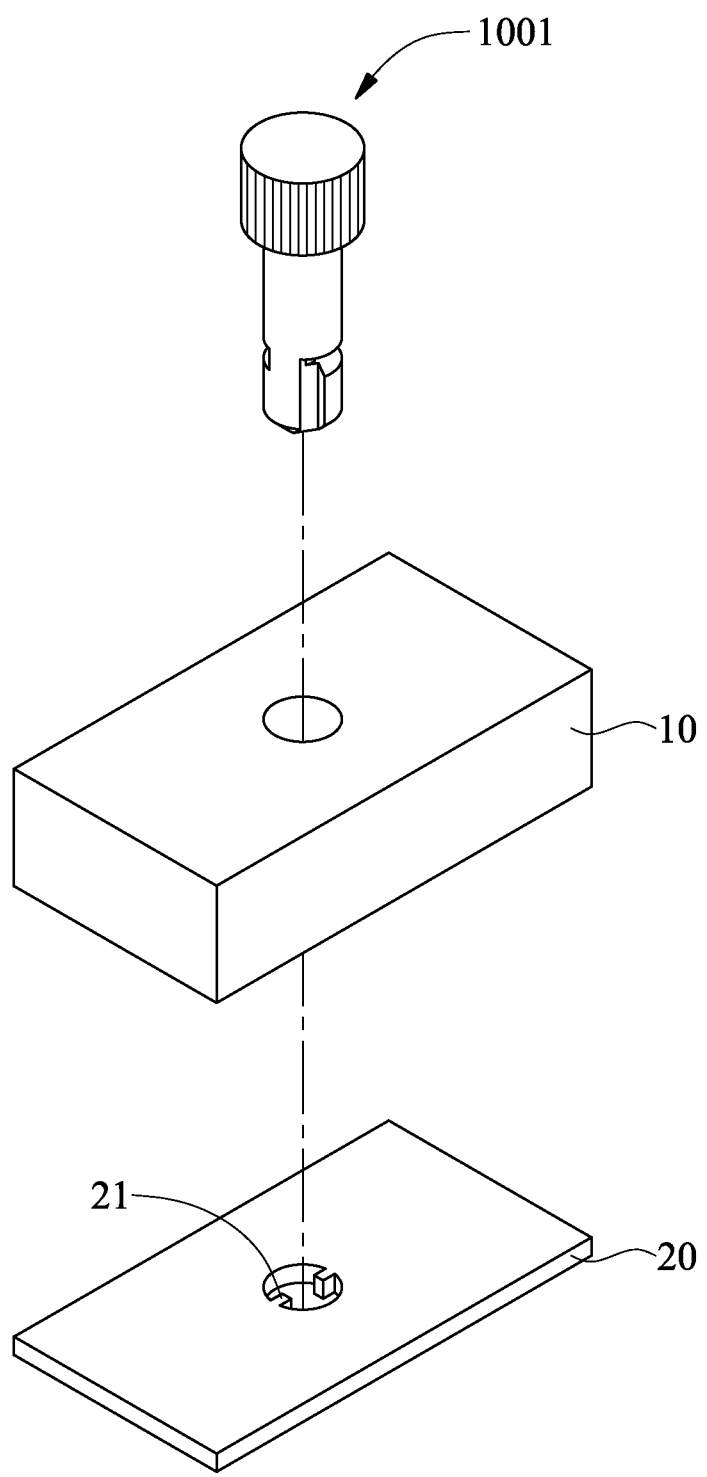
FIG. 2 is a schematic view of the rotatably fastening structure and two objects according to the first embodiment of the present invention.
Figure 3:
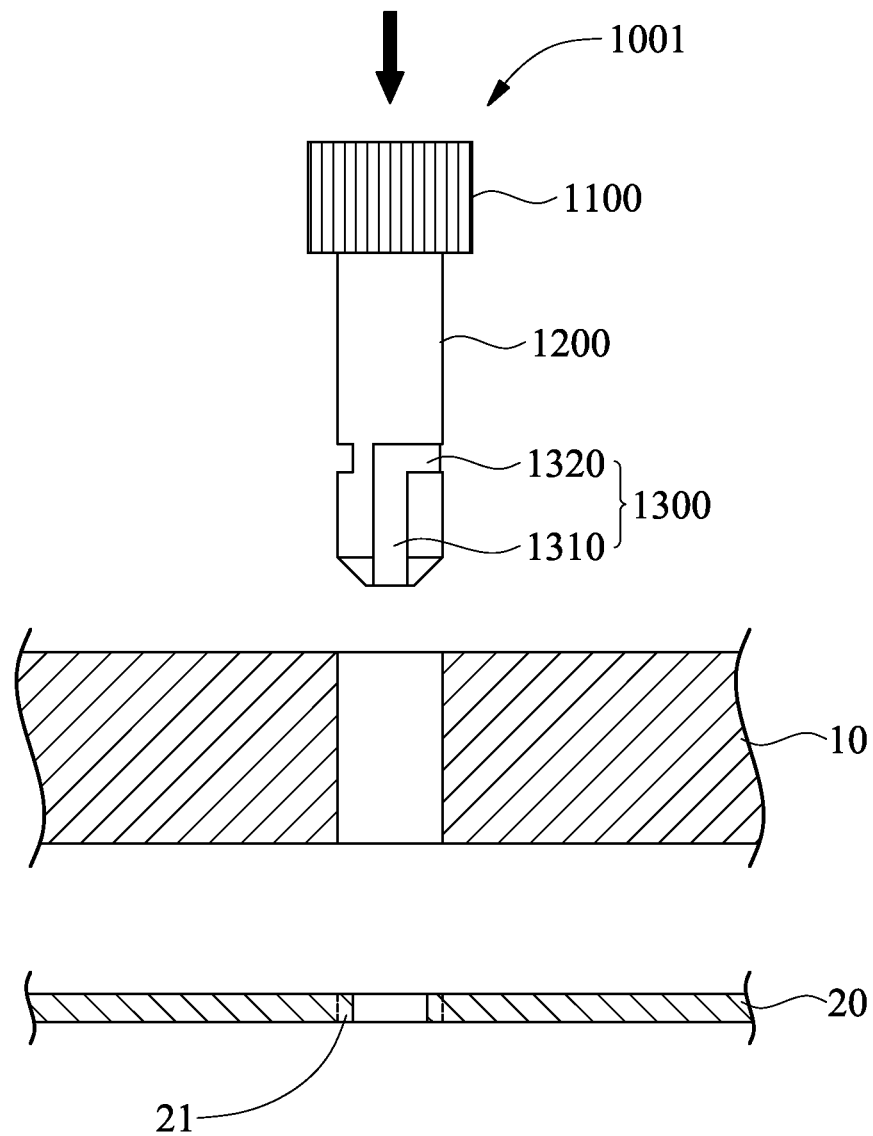
FIG. 3 and FIG. 4 are schematic views of fastening the two objects together by the rotatably fastening structure according to the first embodiment of the present invention.
Figure 4:
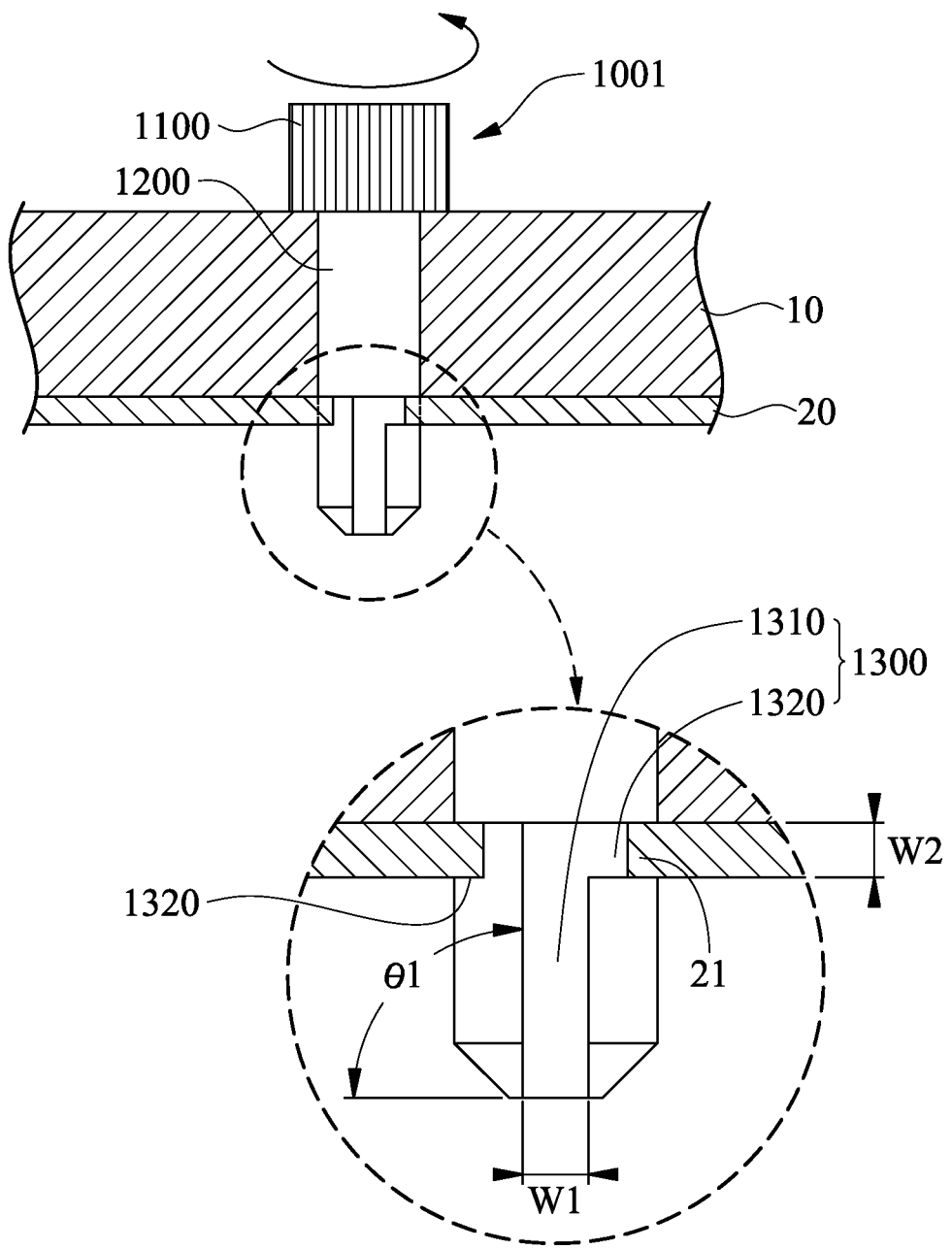

Referring to FIG. 2 through FIG. 4, there are shown schematic views of the rotatably fastening structure 1001 and two objects (i.e., a first object 10 and a second object 20).

Referring to FIG. 2 and FIG. 3, a user passes the rotatably fastening structure 1001 through a hole of the first object 10 and then puts the rotatably fastening structure 1001 at a hole of the second object 20. At this point in time, at least a bump 21 protrudingly disposed at the periphery of the hole of the second object 20 corresponds in position to the first groove 1310 of the fastening portion 1300 of the rotatably fastening structure 1001.

Referring to FIG. 4, in the course of passage of the rotatably fastening structure 1001 through the hole of the second object 20, the at least a bump 21 of the second object 20 moves relative to the rotatably fastening structure 1001, that is, the at least a bump 21 moves from the bottom of the first groove 1310 of the fastening portion 1300 to the junction of the first groove 1310 and the second groove 1320. Then, the user rotates the rotatably fastening structure 1001 so as to move the bump 21 of the second object 20 transversely to the second groove 1320 of the fastening portion 1300. In doing so, the fastening portion 1300 of the rotatably fastening structure 1001 gets fastened with the second object 20 and thus fixes the first and second objects 10, 20 to each other.

As indicated in the above description and FIG. 2 through FIG. 4, the rotatably fastening structure 1001 is structurally simple, and thus the user not only easily fixes the first object 10 and the second object 20 to each other by means of the rotatably fastening structure 1001, but also fixes the first object 10 and the second object 20 to each other without compromising the structural strength of the first object 10 and the second object 20. Moreover, in the situation where the second object 20 is a thin plate, the first object 10 and the second object 20 can still be fixed together by means of the rotatably fastening structure 1001.

Referring to FIG. 4, there is a first included angle θ1 between the first groove 1310 and the bottom side of the fastening portion 1300. The first included angle θ1 ranges from 60° to 120° and preferably equals 90°. Moreover, the width W1 of the first groove 1310 is larger than the width W2 of the second groove 1320 to facilitate the movement of the bump 21 of the second object 20. Furthermore, the first groove 1310 is deeper than the second groove 1320 to facilitate the movement of the bump 21 of the second object 20.

Furthermore, referring to FIG. 1 through FIG. 4, the second groove 1320 extends rightward (as seen in the diagrams) from the top end of the first groove 1310, but the present invention is not limited thereto, because it is also feasible that the second groove 1320 extends transversely and leftward (as seen in the diagrams) from the top end of the first groove 1310. Furthermore, the second groove 1320 extends obliquely, for example, sloping slightly downward or upward. Furthermore, it is also feasible that the second groove 1320 extends transversely from any position on the first groove 1310 except the top end of the first groove 1310, and thus the top end of the first groove 1310 is at a level higher than that of the second groove 1320.

Furthermore, despite the drawings, the shaft 1200 is slender and cylindrical, such that it is easy for the user to pass the shaft 1200 through the hole of the first object 10.

Furthermore, despite the drawings, the fastening portion 1300 has a protruding element (not shown) which can be protrudingly positioned in the second groove 1320 to achieve fastening. The protruding element prevents the bump 21, which has already reached the second groove 1320, from sliding out of the first groove 1310.

Furthermore, in the situation where the second object 20 is made of a resilient material, it is not necessary for the bottom the first groove 1310 to connect with the bottom side of the fastening portion 1300; hence, just by exerting a force upon the rotatably fastening structure 1001, the user is able to move the bump 21 of the second object 20 into the first groove 1310 to effectuate fastening therebetween.

Figure 5:
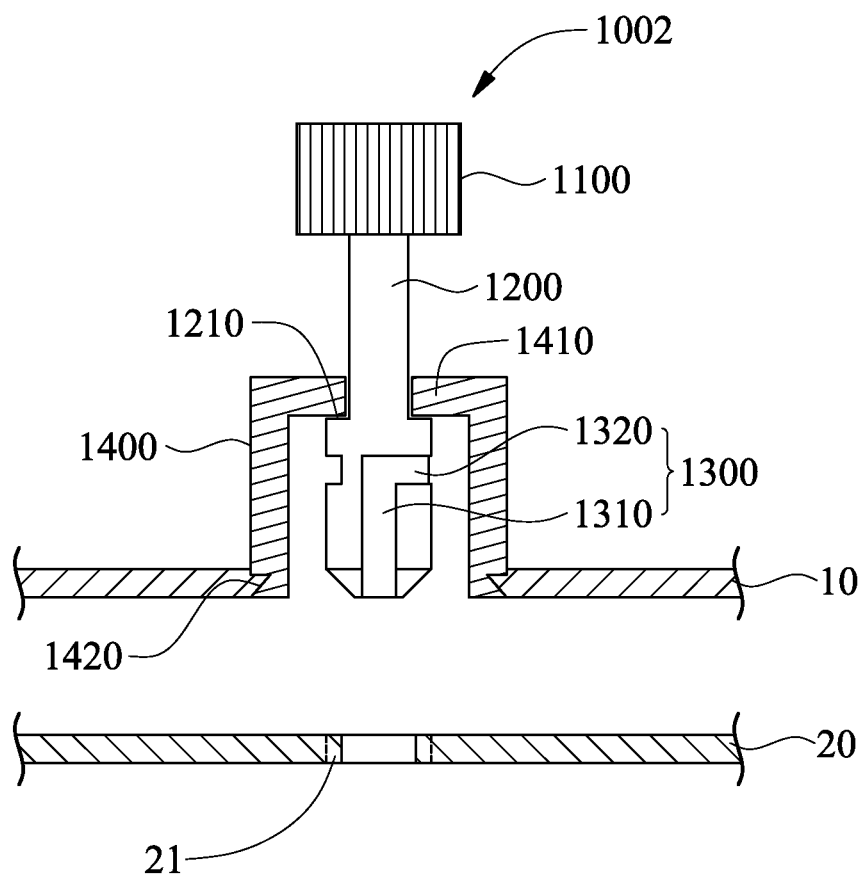
FIG. 5 is a schematic view of a rotatably fastening structure and two objects according to the second embodiment of the present invention.

Referring to FIG. 5, there is shown a schematic view of a rotatably fastening structure 1002 and two objects according to the second embodiment of the present invention. The rotatably fastening structure 1002 is similar to the rotatably fastening structure 1001 except the following. The shaft 1200 has a first position-limiting portion 1210 corresponding in position to the fastening portion 1300. The first position-limiting portion 1210 is in the form of a protrusion or a groove. The rotatably fastening structure 1002 comprises a sleeve 1400. The sleeve 1400 has a second position-limiting portion 1410 and a connection portion 1420. The second position-limiting portion 1410 is disposed at an inner wall of the sleeve 1400. Preferably, the second position-limiting portion 1410 of the sleeve 1400 is positioned proximate to a top of the inner wall of the sleeve 1400 or a middle position of the inner wall of the sleeve 1400. The connection portion 1420 is disposed at a bottom of the sleeve 1400 and connected to the first object 10. As mentioned above, the first position-limiting portion 1210 is in the form of a protrusion or a groove, such that the first position-limiting portion 1210 and the second position-limiting portion 1410 can be interfered with each other, thereby allowing the sleeve 1400 and the shaft 1200 to be movably coupled together and not separable. Hence, the sleeve 1400 protects the shaft 1200 and the fastening portion 1300. Moreover, despite the drawings, the rotatably fastening structure 1002 comprises a resilient element (not shown) with two ends abutting against a bottom of the head 1100 and a top of the sleeve 1400, respectively, to enable the sleeve 1400 to move resiliently and relative to the fastening portion 1300.

Figure 6:
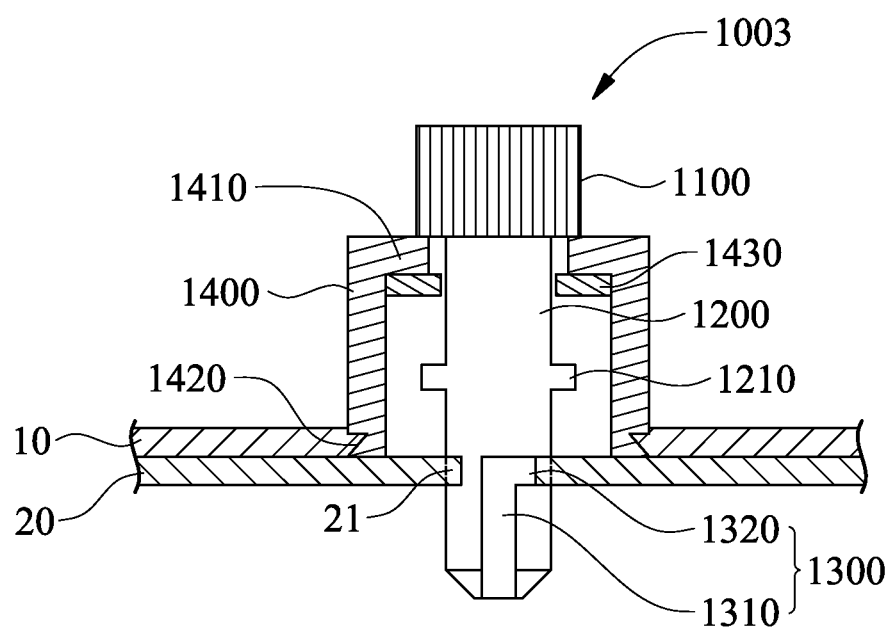
FIG. 6 is a schematic view of a rotatably fastening structure and two objects according to the third embodiment of the present invention.

Referring to FIG. 6, there is shown a schematic view of a rotatably fastening structure 1003 and two objects according to the third embodiment of the present invention. The rotatably fastening structure 1003 is similar to the rotatably fastening structure 1002. The sleeve 1400 has a stopping element 1430 disposed in the sleeve 1400 and positioned below the second position-limiting portion 1410. The stopping element 1430 and the second position-limiting portion 1410 can be interfered with each other, thereby allowing the sleeve 1400 and the shaft 1200 to be movably coupled together and not separable.

Furthermore, the sleeve 1400 of the rotatably fastening structure 1002 or the rotatably fastening structure 1003 enables the fastening of the first object 10 and the second object 20 which are thin.

Figure 7:
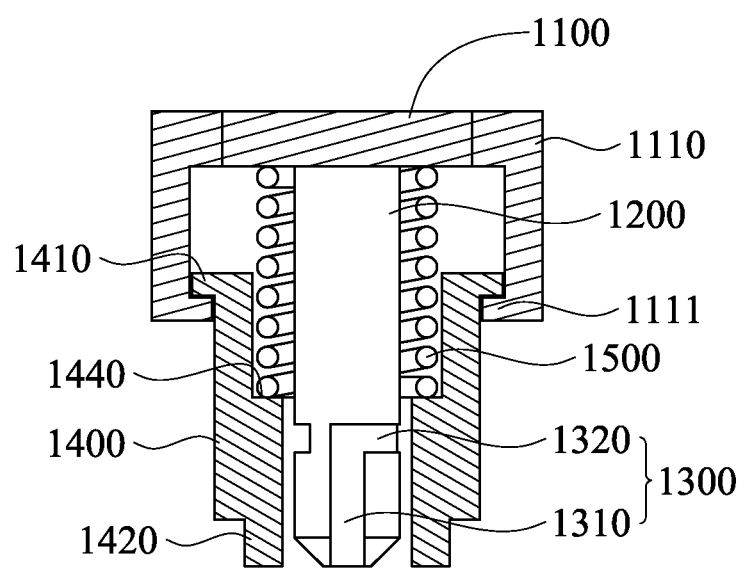
FIG. 7 is a schematic view of a rotatably fastening structure according to the fourth embodiment of the present invention.

Referring to FIG. 7, there is shown a schematic view of a rotatably fastening structure 1004 according to the fourth embodiment of the present invention. The rotatably fastening structure 1004 is similar to the rotatably fastening structure 1001. The head 1100 engages with a cap body 1110 circumferentially. A first position-limiting portion 1111 is disposed at a bottom of the cap body 1110. The rotatably fastening structure 1004 comprises a sleeve 1400 and a resilient element 1500. Moreover, it is feasible that the head 1100 and the cap body 1110 are integrally formed as a unitary structure.

The sleeve 1400 has a second position-limiting portion 1410 disposed on an outer wall of the sleeve 1400. Preferably, the second position-limiting portion 1410 is positioned proximate to the top of the sleeve 1400. A connection portion 1420 is disposed at the bottom of the sleeve 1400. An abutting portion 1440 is disposed on an inner wall of the sleeve 1400 and positioned between the second position-limiting portion 1410 and the connection portion 1420, but the present invention is not limited thereto, because it is also feasible that the abutting portion 1440 is disposed at any position well-known among persons skilled in the art. The first position-limiting portion 1111 and the second position-limiting portion 1410 can be movably interfered with each other, thereby allowing the sleeve 1400 and the cap body 1110 to be movably coupled together and not separable.

The two ends of the resilient element 1500 abut against the bottom of the head 1100 and the abutting portion 1440, respectively, to enable the sleeve 1400 to move resiliently and relative to the cap body 1110. The resilient element 1500 is provided in the form of a spring, a washer, a resilient pad or a resilient post. Furthermore, the rotatably fastening structure 1004 of the present invention can also dispense with the abutting portion 1440 and the resilient element 1500.

Figure 8:
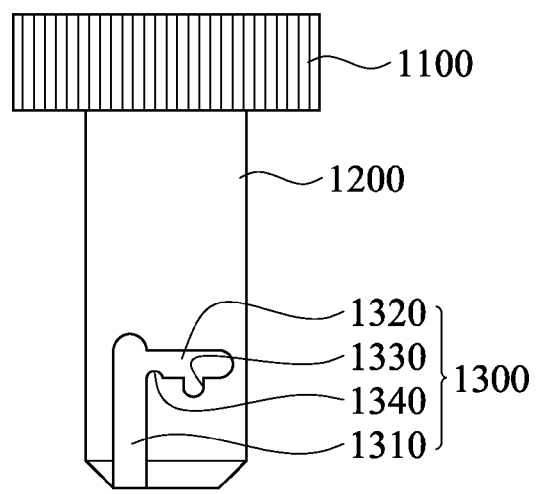
FIG. 8 is a schematic view of a rotatably fastening structure according to the fifth embodiment of the present invention.

Referring to FIG. 8, there is shown a schematic view of a rotatably fastening structure 1005 according to the fifth embodiment of the present invention. The rotatably fastening structure 1005 is similar to the rotatably fastening structure 1001 except for the following. The fastening portion 1300 of the rotatably fastening structure 1005 has a third groove 1330 which is concavely disposed on the lateral surface of the fastening portion 1300 and extends from below the second groove 1320. The second groove 1320 and the third groove 1330 are in communication. Preferably, the second groove 1320 and the third groove 1330 are perpendicular to each other, but the invention is not limited thereto. The fastening portion 1300 of the rotatably fastening structure 1005 further comprises a bump 1340 protruding into the second groove 1320 and disposed between the first groove 1310 and the third groove 1330. The purpose of the third groove 1330 is that a bump (not shown) of the second object (not shown) can move into the third groove 1330, such that the rotatably fastening structure 1005 can fix the first object (not shown) and the second object to each other firmly. Moreover, due to the bump 1340, after the bump of the second object has already moved into the third groove 1330, the bump is prevented from sliding out of the first groove 1310.

Furthermore, the top end of the first groove 1310 is higher than the second groove 1320, whereas the first groove 1310 is perpendicular to the bottom side of the fastening portion 1300. Furthermore, it is also feasible that the third groove 1330 extends from above the second groove 1320. Furthermore, it is also feasible that the third groove 1330 extends both upward and downward from any point (such as the end or the midpoint) of the second groove 1320.

Figure 9:
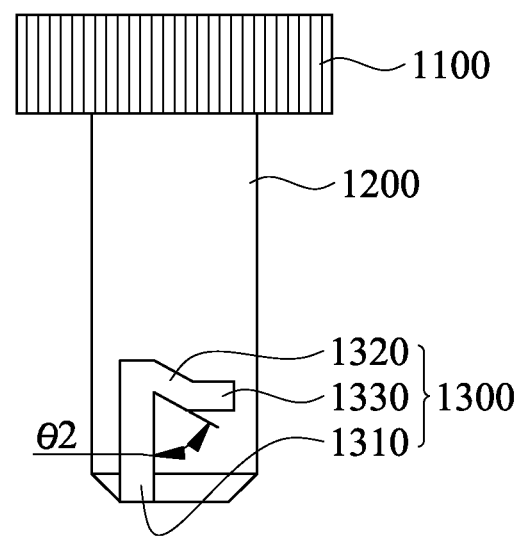
FIG. 9 is a schematic view of a rotatably fastening structure according to the sixth embodiment of the present invention.

Referring to FIG. 9, there is shown a schematic view of a rotatably fastening structure 1006 according to the sixth embodiment of the present invention. The rotatably fastening structure 1006 is similar to the rotatably fastening structure 1001 except for the following. The fastening portion 1300 of the rotatably fastening structure 1006 has a third groove 1330 which is concavely disposed on the lateral surface of the fastening portion 1300 and extends from the end of the second groove 1320. The second groove 1320 and the third groove 1330 are in communication.

Specifically speaking, the second groove 1320 extends obliquely downward from the top of the first groove 1310, whereas the third groove 1330 extends transversely from the end of the second groove 1320, but the present invention is not limited thereto, because it is also feasible that the third groove 1330 extends transversely from one side of the second groove 1320. A second included angle θ2 which ranges from 3° to 87° is formed between the first groove 1310 and the second 1320. Accordingly, the rotatably fastening structure 1006 is advantageously characterized in that after a bump (not shown) of a second object (not shown) has already moved into the third groove 1330, the bump is prevented from sliding out of the first groove 1310.

Furthermore, it is also feasible that the second groove 1320 extends obliquely upward from the top of the first groove 1310, wherein the second included angle θ2 ranges from 93° to 150°. Hence, the rotatably fastening structure 1006 enables the fastening of the first object (not shown) and the second object (not shown).

Figure 10:
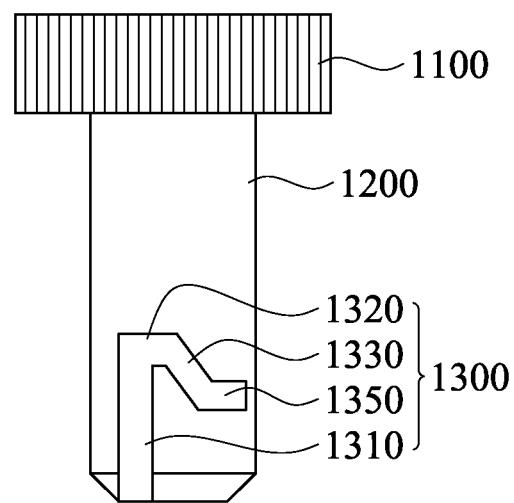
FIG. 10 is a schematic view of a rotatably fastening structure according to the seventh embodiment of the present invention.

Referring to FIG. 10, there is shown a schematic view of a rotatably fastening structure 1007 according to the seventh embodiment of the present invention. The rotatably fastening structure 1007 is similar to the rotatably fastening structure 1006 except the following. As regards the rotatably fastening structure 1007, the third groove 1330 extends downward from the end of the second groove 1320. The fastening portion 1300 has a fourth groove 1350 which is concavely disposed on the lateral surface of the fastening portion 1300 and extends rightward from the end of the third groove 1330. The third groove 1330 and the fourth groove 1350 are in communication. It is also feasible that the fourth groove 1350 extends leftward from the end of the third groove 1330. It is also feasible that the fourth groove 1350 extends leftward or rightward from one side of the third groove 1330. Hence, the rotatably fastening structure 1007 is advantageously characterized in that after a bump (not shown) of a second object (not shown) has already moved into the fourth groove 1350, the bump is prevented from sliding out of the first groove 1310.

Referring to FIG. 10, the second groove 1320 extends transversely from the top of the first groove 1310, whereas the third groove 1330 extends obliquely downward from the end of the second groove 1320, and the fourth groove 1350 extends transversely from the end of the third groove 1330.

Figure 11:
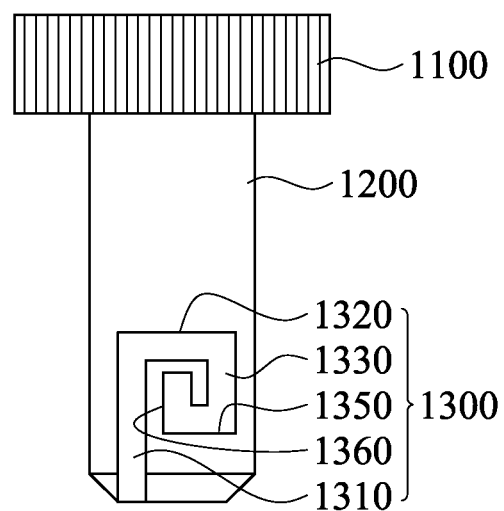
FIG. 11 is a schematic view of a rotatably fastening structure according to the eighth embodiment of the present invention.

Referring to FIG. 11, there is shown a schematic view of a rotatably fastening structure 1008 according to the eighth embodiment of the present invention. The rotatably fastening structure 1008 is similar to the rotatably fastening structure 1007 except for the following. The fastening portion 1300 of the rotatably fastening structure 1008 has a fifth groove 1360 which is concavely disposed on the lateral surface of the fastening portion 1300 and extends upward from the end of the fourth groove 1350. The fourth groove 1350 and the fifth groove 1360 are in communication. It is also feasible that the fifth groove 1360 extends downward from the end of the fourth groove 1350. It is also feasible that the fifth groove 1360 extends upward or downward from one side of the fourth groove 1350. Accordingly, the rotatably fastening structure 1008 is advantageously characterized in that after a bump (not shown) of a second object (not shown) has already moved into the fifth groove 1360, the bump is prevented from sliding out of the first groove 1310.

Figure 12:
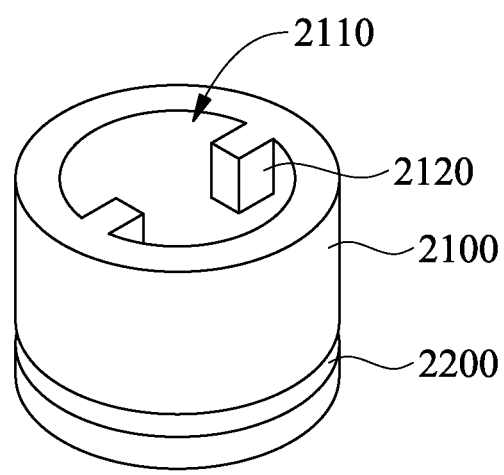
FIG. 12 is a perspective view of a sleeve body of a rotatably fastening combo according to the present invention.
Figure 13:
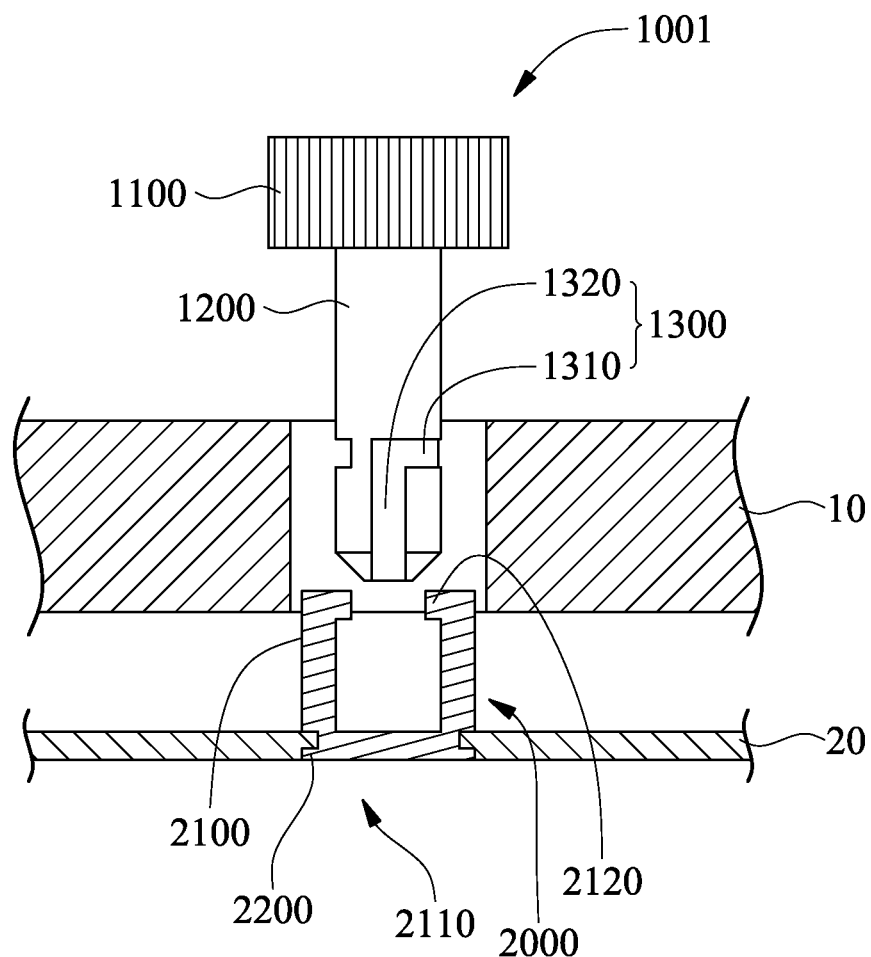
FIG. 13 is a schematic view of separation of the rotatably fastening combo from the two objects according to the present invention.

Referring to FIG. 12 and FIG. 13, in a variant embodiment of the present invention, the hole of the second object 20 lacks a bump corresponding in position to the fastening portion 1300 of the rotatably fastening structure 1001, and thus it is feasible for the user to connect an adjoining element structure 2000 to the second object 20, such that the rotatably fastening structure 1001 and the adjoining element structure 2000 can be coupled together, wherein the rotatably fastening structure 1001 and the adjoining element structure 2000 together form a rotatably fastening combo, thereby enabling the fastening of the first object 10 and the second object 20.

Moreover, in another variant embodiment of the present invention, the second object 20 lacks a hole, and thus it is feasible for the user to fix the adjoining element structure 2000 directly to the second object 20, wherein it is feasible for the adjoining element structure 2000 to be a plate. Hence, the rotatably fastening structure 1001 can fix the first object 10 and the second object 20 to each other, provided that the user drills a hole on the first object 10.

Referring to FIG. 12, the adjoining element structure 2000 comprises a sleeve body 2100 and an object connection portion 2200 disposed at the bottom of the sleeve body 2100. The sleeve body 2100 has a receiving recess 2110 concavely disposed on the sleeve body 2100. An opening of the receiving recess 2110 is disposed at the top of the sleeve body 2100. The opening corresponds in position to the fastening portion 1300 of the rotatably fastening structure 1001. The sleeve body 2100 further has a protruding element 2120 protruding from a lateral surface of the receiving recess 2110 and positioned proximate to the opening. The protruding element 2120 corresponds in position to the second groove 1320 and the first groove 1310 of the fastening portion 1300 of the rotatably fastening structure 1001. The object connection portion 2200 of the adjoining element structure 2000 connects to the second object 20. Specifically speaking, the object connection portion 2200 is connected to the second object 20 by riveting, welding, fastening, expanding, gluing, or magnetic attraction.

The receiving recess 2110 receives the fastening portion 1300 of the rotatably fastening structure 1001.

Figure 14:
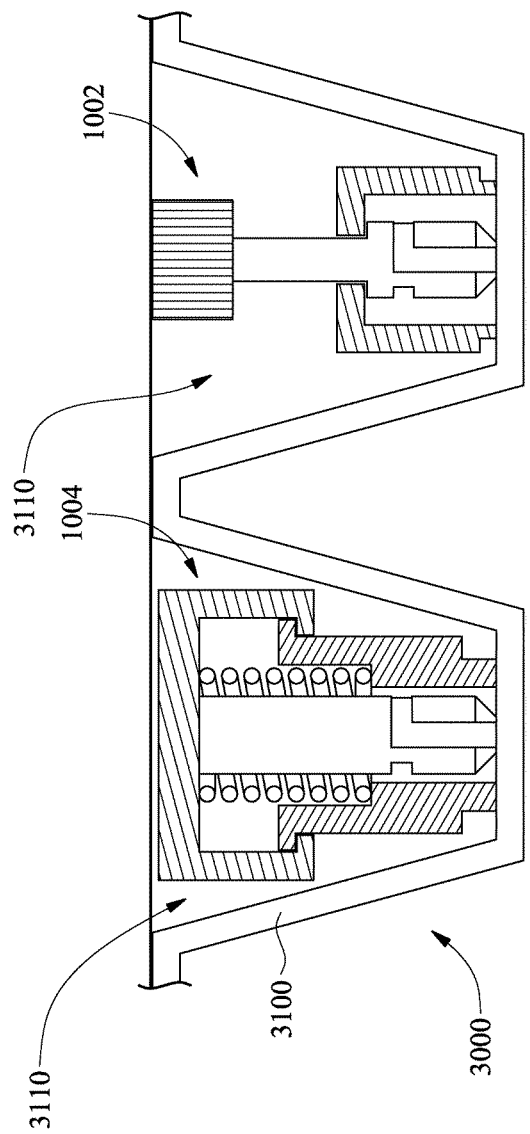
FIG. 14 is a schematic view of a packaging structure which packages the rotatably fastening structure according to the present invention.

At last, referring to FIG. 14, a packaging structure 3000 is provided to package at least asaid rotatably fastening structure 1002, but the present invention is not limited thereto, because it is also feasible for the packaging structure 3000 to package the rotatably fastening structures 1001, 1003, 1004.

The packaging structure 3000 comprises at least a position-limiting receiving body 3100. The at least a position-limiting receiving body 3100 has a position-limiting receiving space 3110. The rotatably fastening structure 1002 is disposed in the position-limiting receiving space 3110, such that it is convenient for the user to store the rotatably fastening structure 1002.

In conclusion, a rotatably fastening structure of the present invention enables users to connect two objects together quickly without compromising the structural strength of the two objects and is applicable to thin objects. Moreover, the rotatably fastening structure is structurally simple and unlikely to get damaged.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A grooved rotatably fastening structure, comprising:
   a head;
   a shaft connected to the head;
   a sleeve having a connection portion disposed at the sleeve, the sleeve movably coupled to the shaft or the head and not separable; and
   a fastening portion connected to the shaft and having:
      a first groove concavely disposed in a lateral surface of the fastening portion and extending upward from a bottom of the fastening portion; and
      a second groove concavely disposed in the lateral surface of the fastening portion and extending transversely or obliquely from the first groove such that the first groove is in communication with the second groove,
   wherein the head, the shaft, and the fastening portion are arranged in top-to-bottom sequence, and the sleeve is tube-shaped to receive and protect the fastening portion.

2. The grooved rotatably fastening structure of claim 1, wherein the shaft having a first position-limiting portion, the sleeve having a second position-limiting portion disposed on an inner wall of the sleeve, the first position-limiting portion and the second position-limiting portion are interfered with each other, thereby allowing the sleeve and the shaft to be movably coupled together and not separable.

3. The grooved rotatably fastening structure of claim 2, wherein the sleeve further has a stopping element disposed in the sleeve, positioned below the second position-limiting portion, and interfered with the second position-limiting portion, thereby allowing the sleeve and the shaft to be movably coupled together and not separable.

4. The grooved rotatably fastening structure of claim 1, wherein a bottom of the first groove is formed in a bottom side of the fastening portion.

5. The grooved rotatably fastening structure of claim 1, wherein a first included angle ranging from 60° to 120° is formed between the first groove and the bottom side of the fastening portion.

6. The grooved rotatably fastening structure of claim 1, wherein the first groove is of a larger width than the second groove.

7. The grooved rotatably fastening structure of claim 1, wherein the first groove is deeper than the second groove.

8. The grooved rotatably fastening structure of claim 1, wherein the shaft is cylindrical.

9. The grooved rotatably fastening structure of claim 1, wherein a top end of the first groove is higher than the second groove.

10. The grooved rotatably fastening structure of claim 1, wherein the fastening portion further has a third groove concavely disposed in the lateral surface of the fastening portion and extending from above or below the second groove, wherein the second groove and the third groove are in communication.

11. The grooved rotatably fastening structure of claim 10, wherein the second groove is perpendicular to the third groove.

12. The grooved rotatably fastening structure of claim 11, wherein the fastening portion further has a fourth groove concavely disposed in the lateral surface of the fastening portion and extending transversely from the third groove, wherein the third groove and the fourth groove are in communication.

13. The grooved rotatably fastening structure of claim 12, wherein the fastening portion further has a fifth groove concavely disposed in the lateral surface of the fastening portion and extending upward or downward from the fourth groove, wherein the fourth groove and the fifth groove are in communication.

14. The grooved rotatably fastening structure of claim 1, wherein the fastening portion further has a protruding element protruding from the second groove.

15. The grooved rotatably fastening structure of claim 1, wherein the fastening portion further has a third groove concavely disposed in the lateral surface of the fastening portion and extending transversely from the second groove, wherein the second groove and the third groove are in communication.

16. The grooved rotatably fastening structure of claim 1, wherein the second groove slopes downward from a top end of the first groove.

17. The grooved rotatably fastening structure of claim 16, wherein a second included angle ranging from 3° to 87° is formed between the first groove and the second groove.

18. The grooved rotatably fastening structure of claim 1, wherein the second groove slopes upward from a top end of the first groove.

19. The grooved rotatably fastening structure of claim 18, wherein a second included angle ranging from 93° to 150° is formed between the first groove and the second groove.

20. The grooved rotatably fastening structure of claim 1, wherein a cap body circumferentially is disposed at the head, a first position-limiting portion is disposed at a bottom of the cap body, the sleeve having a second position-limiting portion disposed on an outer wall of the sleeve, the first position-limiting portion and the second position-limiting portion are interfered with each other, thereby allowing the sleeve and the cap body to be movably coupled together and not separable.

21. The grooved rotatably fastening structure of claim 20, further comprising:
   an abutting portion disposed at the sleeve; and
   a resilient element with two ends abutting against the bottom of the head and the abutting portion, respectively.

22. The grooved rotatably fastening structure of claim 21, wherein the resilient element is one of a spring, a washer, a resilient pad, and a resilient post.

23. A packaging structure in combination with the grooved rotatably fastening structure of claim 1, the packaging structure comprising at least a position-limiting receiving body which has a position-limiting receiving space, such that the grooved rotatably fastening structure is disposed in the position-limiting receiving space.

\* \* \* \* \*